United States Patent
Cooper

(10) Patent No.: US 9,084,010 B2
(45) Date of Patent: Jul. 14, 2015

(54) METHOD AND SYSTEM FOR STAGGERED STATISTICAL MULTIPLEXING

(75) Inventor: Jeffrey Allen Cooper, Rocky Hill, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 2988 days.

(21) Appl. No.: 10/535,112

(22) PCT Filed: Oct. 27, 2003

(86) PCT No.: PCT/US03/33887
§ 371 (c)(1),
(2), (4) Date: May 16, 2005

(87) PCT Pub. No.: WO2004/047444
PCT Pub. Date: Jun. 3, 2004

(65) Prior Publication Data
US 2006/0018379 A1      Jan. 26, 2006

Related U.S. Application Data

(60) Provisional application No. 60/426,646, filed on Nov. 15, 2002.

(51) Int. Cl.
  *H04N 7/12*    (2006.01)
  *H04N 11/02*   (2006.01)
  *H04N 11/04*   (2006.01)
  (Continued)

(52) U.S. Cl.
  CPC ......... *H04N 21/4347* (2013.01); *H04N 19/114* (2014.11); *H04N 21/2365* (2013.01); *H04N 21/23655* (2013.01); *H04N 21/234381* (2013.01); *H04N 21/2662* (2013.01); *H04N 21/26275* (2013.01)

(58) Field of Classification Search
  USPC .............. 375/240.01, 240.12, 240.25, 240.26
  See application file for complete search history.

(56) References Cited

U.S. PATENT DOCUMENTS 4,002,845 A * 1/1977 Kaul et al. .................... 370/509
5,451,999 A * 9/1995 Wesolowski .................. 348/180

(Continued)

FOREIGN PATENT DOCUMENTS

JP      61-74435 A      4/1986
JP      7-184193 A      7/1995

(Continued)

OTHER PUBLICATIONS

Search Report Dated Mar. 19, 2004.

(Continued)

*Primary Examiner* — Geepy Pe
(74) *Attorney, Agent, or Firm* — Robert D. Shedd

(57) ABSTRACT

In a multi-channel video transmission system in which channel video segments are operated on by corresponding channel video encoders to encode the video segments into frames organized into groups of defined frame types, an apparatus and method to cause a temporal staggering for the processing of a specific frame type among the various channels. In one preferred embodiment, the apparatus includes a frame counter to synchronize reset signals associated with the corresponding channel video encoders and a means for providing a timing offset to channel video encoders corresponding to a selected frame stagger for a particular corresponding channel.

21 Claims, 6 Drawing Sheets

(51) Int. Cl.
*H04N 21/434* (2011.01)
*H04N 21/2343* (2011.01)
*H04N 21/2365* (2011.01)
*H04N 21/262* (2011.01)
*H04N 21/2662* (2011.01)
*H04N 19/114* (2014.01)

(56) References Cited

U.S. PATENT DOCUMENTS

| | | | |
|---|---|---|---|
| 5,877,812 A | | 3/1999 | Krause |
| 6,151,334 A | | 11/2000 | Kim et al. |
| 6,181,821 B1 | | 1/2001 | Lim |
| 6,212,201 B1 | | 4/2001 | Hinderks et al. |
| 6,370,153 B1 | | 4/2002 | Eng |
| 6,614,843 B1 * | | 9/2003 | Gordon et al. ........... 375/240.01 |

FOREIGN PATENT DOCUMENTS

| | | |
|---|---|---|
| JP | 2001-028753 | 1/2001 |
| WO | WO 95/29546 | 11/1995 |
| WO | WO 99/29108 | 6/1999 |

OTHER PUBLICATIONS

Krunz M, Impact of Video Scheduling on Bandwidth Allocation for Multiplexed MPEG Streams, Multimedia Sytems, Springer—Verlag, vol. 5, No. 6, 1997, pp. 347-357.

Roh B-H, Starting Time Selection and Scheduling Methods for Minimum Cell Loss Ratio of Superposed VBR MPEG Video Traffic, IEEE Transactions on Circuits and Systems for Video Technology, IEEE Service Center, Piscataway, NJ, vol. 9, No. 6, Sep. 1999, pp. 1051-8215.

* cited by examiner

| NUMBER OF CHANNELS | GOP LENGTHS | GOP STRUCTURE |
|---|---|---|
| 9 | 9 | IBBPBBPBB |
| 10 | 10 | IPBBPBBPBB |
| 11 | 11 | IBPBBPBBPBB |
| 12 | 12 | IBBPBBPBBPBB |
| 13 | 13 | IPBBPBBPBBPBB |
| 14 | 14 | IBPBBPBBPBBPBB |
| 15 | 15 | IBBPBBPBBPBBPBB |
| 16 | 16 | IPBBPBBPBBPBBPBB |
| 17 | 17 | IBPBBPBBPBBPBBPBB |
| 18 | 9,9 | IBBPBBPBB,IBBPBBPBB |
| 19 | 9,10 | IBBPBBPBB,IPBBPBBPBB |
| 20 | 10,10 | IPBBPBBPBB,IPBBPBBPBB |
| 21 | 10,11 | IPBBPBBPBB,IBPBBPBBPBB |
| 22 | 11,11 | IBPBBPBBPBB,IBPBBPBBPBB |
| 23 | 11,12 | IBPBBPBBPBB,IBBPBBPBBPBB |
| 24 | 12,12 | IBBPBBPBBPBB,IBBPBBPBBPBB |
| 25 | 12,13 | IBBPBBPBBPBB,IPBBPBBPBBPBB |
| 26 | 13,13 | IPBBPBBPBBPBB,IPBBPBBPBBPBB |
| 27 | 13,14 | IPBBPBBPBBPBB,IBPBBPBBPBBPBB |
| 28 | 14,14 | IBPBBPBBPBBPBB,IBPBBPBBPBBPBB |
| 29 | 14,15 | IBPBBPBBPBBPBB,IBBPBBPBBPBBPBB |
| 30 | 14,15 | IBBPBBPBBPBBPBB,IBBPBBPBBPBBPBB |

FIG. 6

METHOD AND SYSTEM FOR STAGGERED STATISTICAL MULTIPLEXING

CROSS REFERENCE TO RELATED APPLICATION

This application claims the benefit, under 35 U.S.C. §365 of International Application PCT/US03/33887, filed Oct. 27, 2003, which was published in accordance with PCT Article 21(2) on Jun. 3, 2004 in English and which claims the benefit of U.S. provisional patent application No. 60/426,646, filed Nov. 15, 2002.

FIELD OF THE INVENTION

The invention relates generally to coding/compression of digital video signals, and more particularly to improved bandwidth utilization during concurrent transmission of a plurality of video signals.

BACKGROUND OF THE INVENTION

Video signals are inherently highly complex and place substantial resource demands on the transmission medium arranged to transmit such signals—both bandwidth and transmission power. Because bandwidth (and often power, as well) is typically a constrained resource, various techniques have been developed to compress the video signals prior to transmission, and thereby reducing the required transmission bandwidth. These techniques typically first digitize the video signal in order to improve the efficiency of the compression process, as well as other transmission processes including error correction.

A widely used methodology for compression and coding of digital video signals is MPEG-2, as described and codified in ISO 13818-2. Indeed, the MPEG-2 methodology is an integral part of the Advanced Television System standard as adopted by the Advanced Television Systems Committee (ATSC). MPEG-2 is also widely used for transmission and/or recording of NTSC (National Television Standards Committee) based material, particularly cable and satellite transmission and DVD recordings. A newer member of the MPEG family of coding/compression algorithms, designated MPEG-4, offers significantly improved bandwidth compression, but has not yet been adopted for use with ATSC or NTSC television.

In the case where a plurality of substantially non-correlated video signals are transmitted simultaneously via a common transmission medium, such as broadcast television or CATV channels, a further reduction in the required transmission bandwidth can be achieved by use of a technique known as statistical multiplexing. The essential idea of statistical multiplexing (hereafter usually abbreviated as "stat mux") is to dynamically spread the total transmission bandwidth among the plurality of signals, or channels. For example, at a given time, channel 3 may require a higher number of bits/pixel (due to a complex scene) when channel 5 does not need as many. Therefore, a statistical multiplexer allocates more bits to channel 3 than it does to channel 5 (stealing bits from channel 5). This situation is always changing and therefore the controller for the statistical multiplexer must be designed to react quickly to changes in video complexity on a given channel.

Video complexity is very bursty and stat mux can enable a broadcaster to achieve high quality during the high-complexity video segments on a given channel. Even more valuable, a broadcaster can fit more video channels into the transmission bandwidth. That is, by taking advantage of the average video complexity being low on most channels, extra space is made to increase the number of video channels.

The determination of which channel should receive the most bits is difficult, however, especially in a real time encoding system for broadcast. Most known solutions take a complexity measure from the input video frames on each channel, and then allocate a fixed number of bits for use on the channel over the next group of pictures (normally 12 or 15 video frames) or sometimes on the next picture. Because these systems are not frame synchronized (and even if they were), at any given stat mux allocation time, the type of frames requesting bits is a variable.

A known statistical multiplexing system developed by the assignee of this application, Thomson Consumer Electronics, for a satellite television service, operates in a standard definition MPEG2 system with distributed hardware video encoders. Implementing stat mux on this system is difficult because each MPEG2 video encoder has its own rate control system, and stat mux must be layered on top of it. Bit allocations are at the GOP level only, and no frame level synchronization is possible.

SUMMARY OF INVENTION

The invention is a method and apparatus for us in a multichannel video transmission system in which channel video segments are operated on by corresponding channel video encoders to encode the video segments into a plurality of frames organized into frame types having defined frame patterns. The frame transmission alignment is then arranged among a plurality of channels concurrently transmitted via a common transmission medium. A specified frame type is arranged for transmission in each channel so as to avoid temporal alignment with other ones of the same specified frame type in other channels.

In effect, the invention synchronizes multiple video transmission and encoding channels and then staggers the compressed frame types to distribute the bit allocations evenly.

In one preferred embodiment, based on use of MPEG coding/compression of the video signals, the Intra-coded (I) frames are temporally displaced so as to avoid a temporal alignment of I frames among a selected group of channels sharing a common transmission medium.

BRIEF DESCRIPTION OF THE DRAWINGS

FIG. 6 is an illustrative GOP structure for implementing the invention in a multi-channel video broadcast system, in accordance with the principles of the present invention.

DETAILED DESCRIPTION OF THE INVENTION

The invention is directed to an improved method for providing statistical multiplexing in a transmission medium carrying a plurality of substantially non-correlated digital signals, and will be described hereafter in terms of a preferred embodiment—video signals transmitted via a broadcast video system or a CATV or satellite system. While that preferred embodiment is premised on a staggering of the Intra coded frames (I frames) developed pursuant to the MPEG coding methodology, it should be understood that the methodology of the invention is intended to be applicable to the staggering of independently encoded frames in frame sequences of alternate coding/compression methodologies. Indeed, the method of the invention should be understood as being applicable to the provision of staggered statistical multiplexing for any plurality of substantially non-correlated signals transmitted via a common transmission medium where an identifiable independently-encoded frame is determined for given segments of the plurality of signals.

Figure 1:
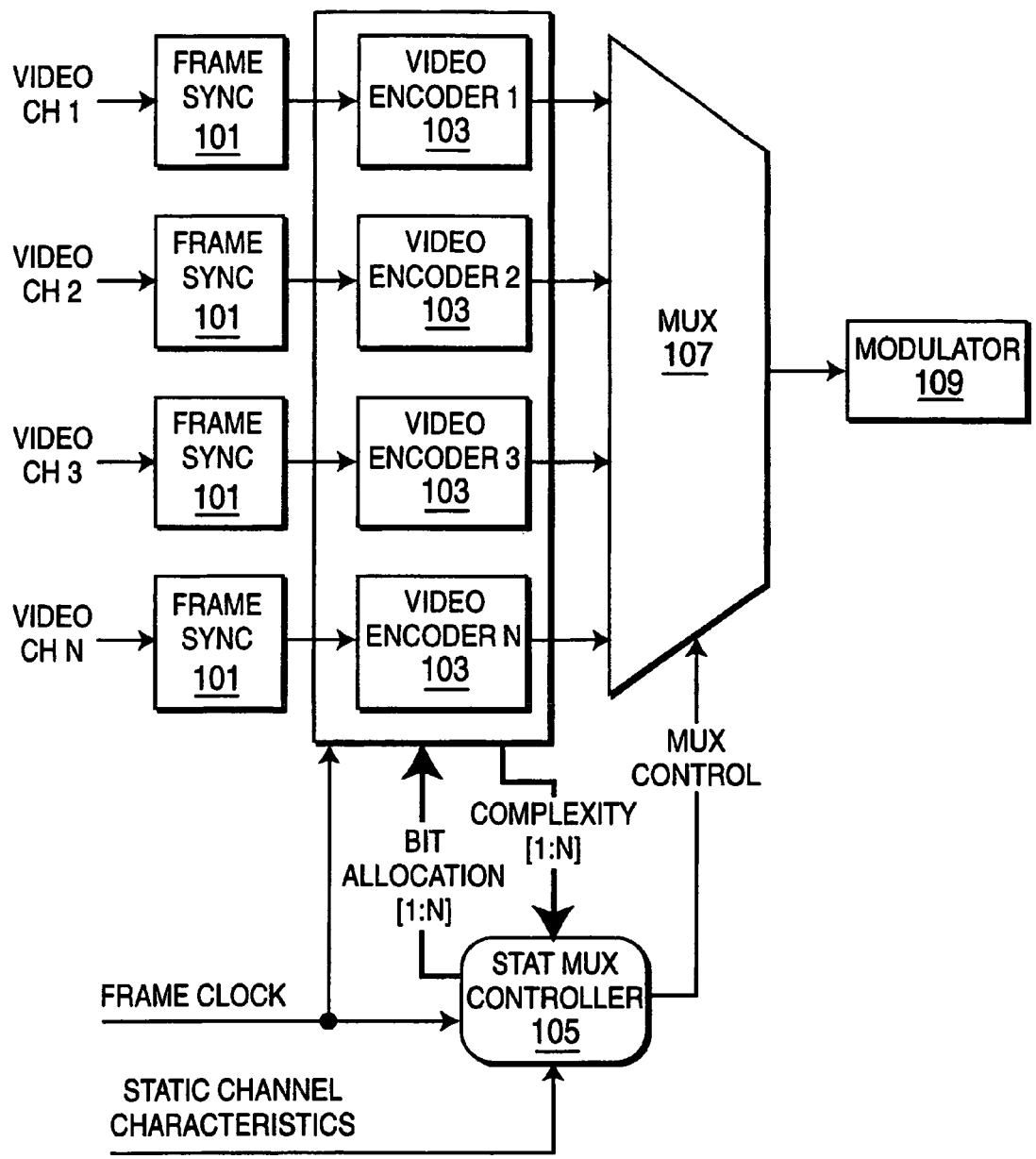
FIG. 1 is a block diagram of a broadcast video transmission system incorporating statistical multiplexing, in accordance with the principles of the present invention.

A block diagram of a broadcast video transmission system is shown in FIG. 1, the system being composed of N input video channels. Each video channel is frame synchronized (by Frame Sync 101) to a common video clock (to establish a frame period, among other timing functions). Therefore, all of the Video Encoders 103 are locked to the same video frame rate. A complexity measure is created from each encoder and delivered to the Stat Mux Controller 105. The Stat Mux Controller allocates the total available bit rate among the N Encoders 103. Based on signals from the Stat Mux Controller, statistical multiplexing is applied to the N video channels by Mux 107, with the output of Mux 107 provided as an input to Modulator 109. In the instant exemplary embodiment, the stat mux algorithm allocates new bit budgets for each channel for each frame period.

The MPEG video coding/compression standard organizes the video frames into 3 frame types: I, P, and B frames (Intra, Predictive, and Bi-directionally Predictive). I frames use no motion estimation from previous frames. P frames use the previous anchor frame for motion estimation, and B frames use the previous and future anchor frames for motion estimation. In general, I frames are the largest, in terms of compressed bits per pixel, followed by P frames, and then B frames. The relative sizes are unimportant for the description of the invention following.

The distance between I frames (which corresponds to the length of the Group of Pictures, or GOP—i.e., there is one and only one I frame per GOP), distance between anchor frames and other aspects of the GOP are not defined in the compression standards. Therefore, an implementer must decide how to organize the GOP structure. For purposes of discussion, a GOP size of 9 frames and a distance between anchor frames of 3 will be assumed. (In the shorthand vernacular of the art, this is known as N=9, M=3). However, it should be understood that the described methodology of the invention is applicable to any type of GOP structure.

Figure 2:
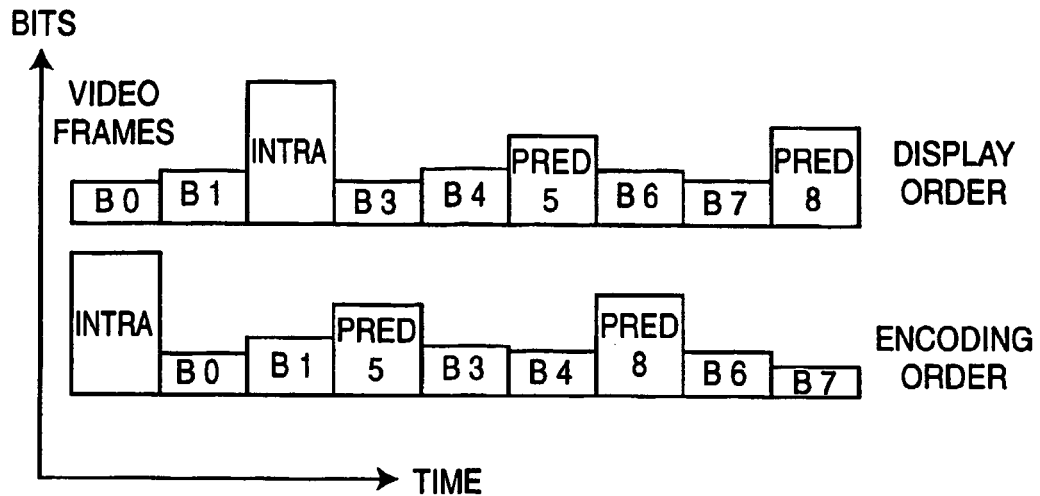
FIG. 2 is an illustration of display order versus encoding order for a sequence of MPEG-encoded video frames in a single channel, in accordance with the principles of the present invention.

As is well known, the ordering of frame types in a GOP differs between the display order and the encoding order. While the I frame in the display order may well fall somewhere in the middle of the GOP, the frames are re-ordered during encoding since the B frames require an anchor frame in the future for encoding. This reordering is illustrated in FIG. 2, which shows frame types and sizes versus time for an illustrative GOP in display order and encoding order (also known as transmission order).

Figure 3:
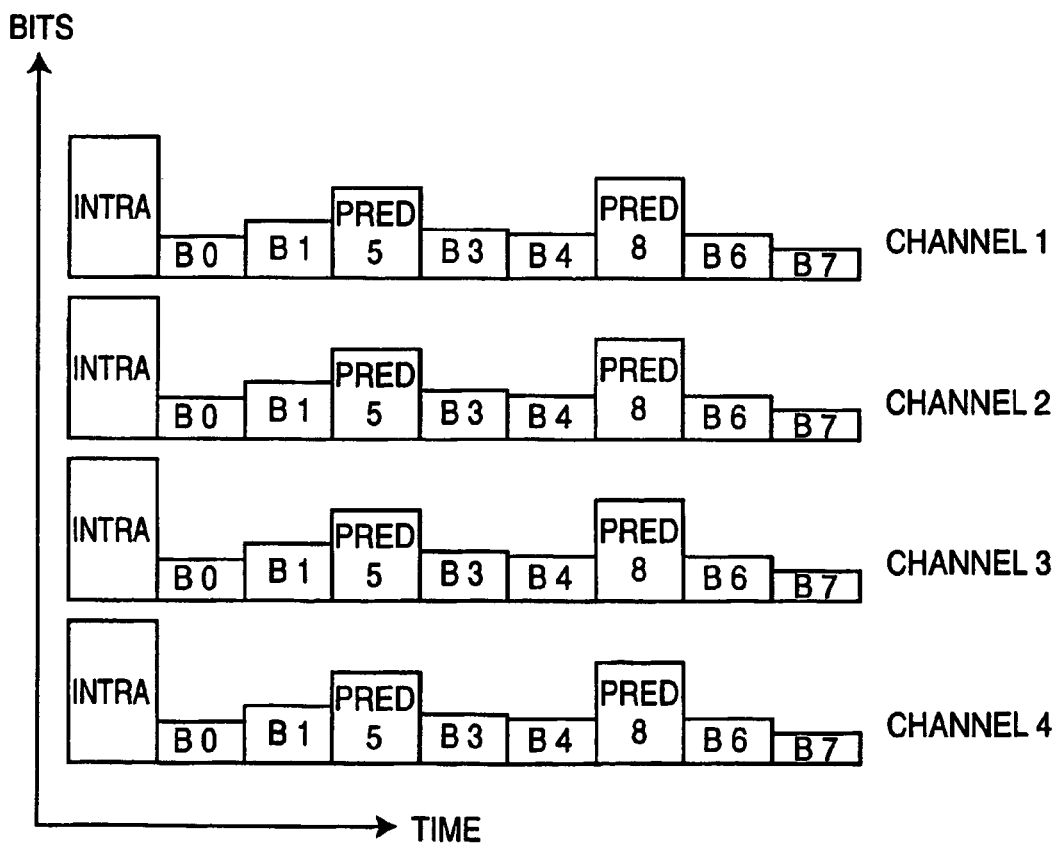
FIG. 3 is an illustration of synchronized, encoded video frames for a 4 channel video broadcast system, in accordance with the principles of the present invention.

FIG. 3 shows a GOP sequence for each channel of an illustrative 4 channel video broadcast system with synchronized frames. As is apparent from the figure, the I frames for all of the channels appear at the same time point, and thus the stat mux controller must allocate all the I frame bits simultaneously. This is a disadvantage for two reasons:

1. The Intra frame is the most important frame in the GOP sequence since it is the first anchor frame for the GOP. That is, all the frames in the GOP have dependencies on the Intra frame. This creates considerable difficulty for the stat mux algorithm since all channels would benefit from high quality; and
2. Nothing is known about the future frames (e.g., whether complexity will decrease or increase), and therefore only a uniform distribution of bits can be made. (While static characteristics for the program material on individual channels—e.g., sports, movies, etc.—may be available to the stat mux in order to provide a rudimentary level of complexity prediction, that is in addition to any stat mux algorithm). Future frame information could be created, but only by buffering up these frames, which is an expensive solution.

Figure 4:
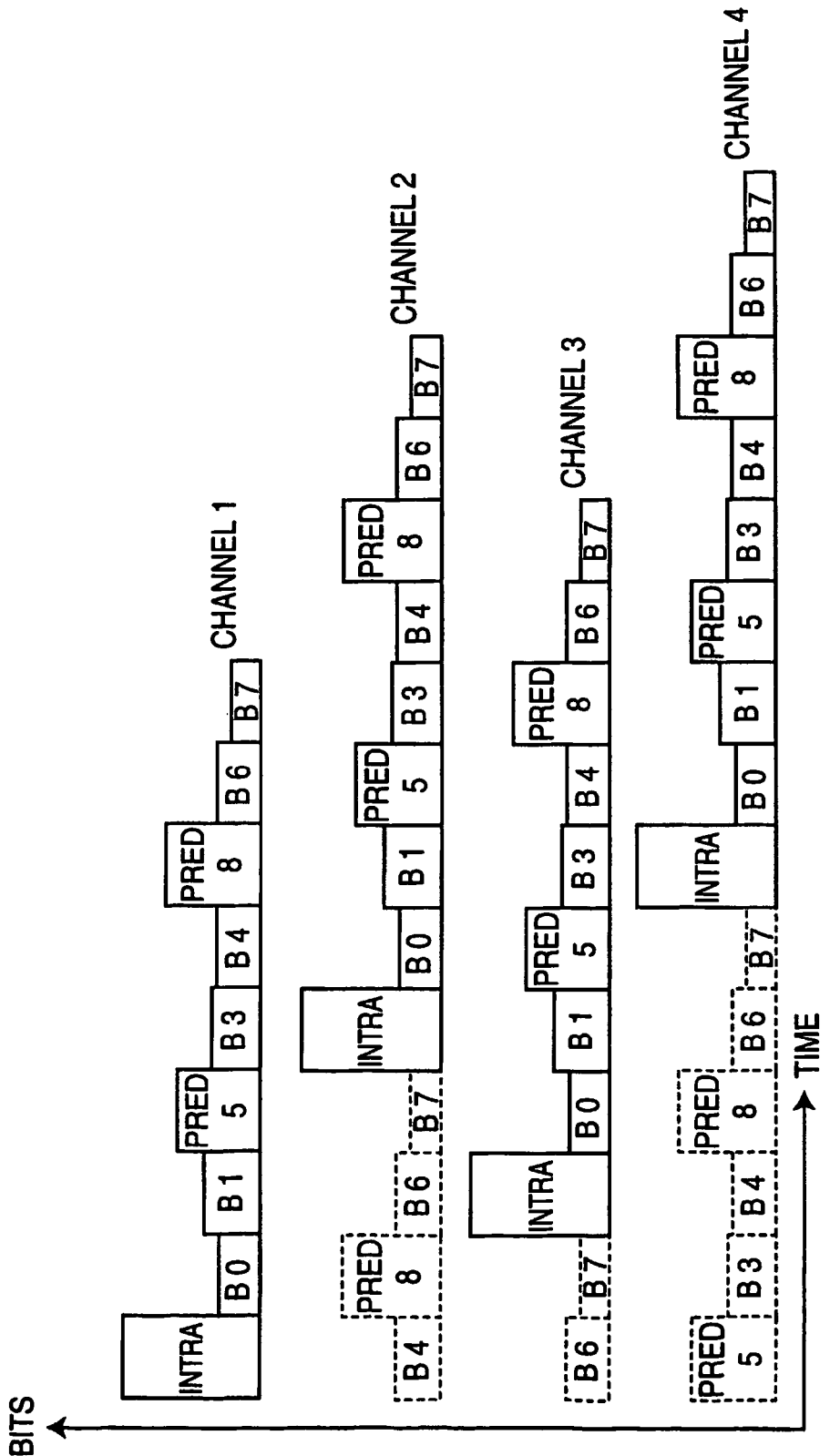
FIG. 4 is an illustration of synchronized, encoded video frames for a 4 channel video broadcast system using staggered I frames, in accordance with the principles of the present invention.

GOP sequences for a similar 4 channel video broadcast system with synchronized frame periods is shown in FIG. 4, but here the I frames have been staggered, in accordance with the principles of the present invention. Note that the frame sequences depicted by solid lines in FIG. 4 are intended to represent the GOPs for each channel at start up of the frame staggering method of the present invention. However, to also illustrate the repeating pattern of the GOPs over time, the frames that would appear in each frame position preceding the I frame for each channel in subsequent processing intervals are shown in the figure by dotted lines. With the I frames staggered as illustrated in the figure, the stat mux controller is now given much more flexibility when allocating bits for each frame period. When allocating bits for the first frame period, it can give priority to the channel 1 Intra frame, then channel 4's P frame, then channel's 2 and 3 B frames. If not enough bits are available for this time slot, the B frames can be degraded with minor negative results (since the B frames are not anchor frames).

Another advantage of staggered I frames, in accordance with the principles of the present invention, is that the frames farther away from the I-frame can also be degraded more than ones close to the I-frame. This is due to P frames being predicted from the previous P frame. Therefore, the farther away a frame is from the initial I-frame, the less effect a degradation of that frame will have on future pictures.

One particularly important advantage of the frame stagger methodology of the invention is that it avoids the need for the overall stat mux algorithm to use a complexity measure in determining the allocation of bits among the channels. As will be well understood by those of skill in the art, stat mux algorithms typically measure GOP complexity and then assign a number of bits per GOP per channel. By staggering the high priority frames in the multi-channel GOPs, in accordance with the principles of the present invention, the need for that complexity measure is eliminated. It should also be understood in this regard that the staggering methodology of the present invention could otherwise be combined with the known stat mux algorithms (along with removal of the complexity measure functionality). It should be apparent, as well, that static constraints—such as giving a sports channel more bits than a movie channel—can still be used with the present invention.

Yet another benefit of staggering is that the average bit budget per frame period is more uniform. That is, there is not a large I-frame spike as in the non-staggered case. A more uniform bit allocation per frame period helps the channel multiplexer achieve a low delay between the video compression encoders and the modulation, and ultimately the receiver. Another way to view this advantage is that the multiplexer does not need as much buffering to smooth out the peak bit rates coming from the encoders.

The frame staggering of the present invention is hereafter described for a broadcast system in which there are many video channels to multiplex. As will be seen, when the number of channels is large, the overall system can be organized such that a uniform bit allocation method can be used.

Initially, it should be observed that the optimum staggering order is not a simple I-frame time stagger. Rather, the optimum stagger order is achieved by keeping the distance between I-frames at a maximum on average. Of course, the number of video channels affects the actual spacing. In the case of 4 video channels illustrated in FIG. 4, some extra space (2 frame periods) is created by alternating the spacing. In the case of 9 video channels (and a GOP of 9), then the spacing between I frames is only 1 frame period.

Figure 5:
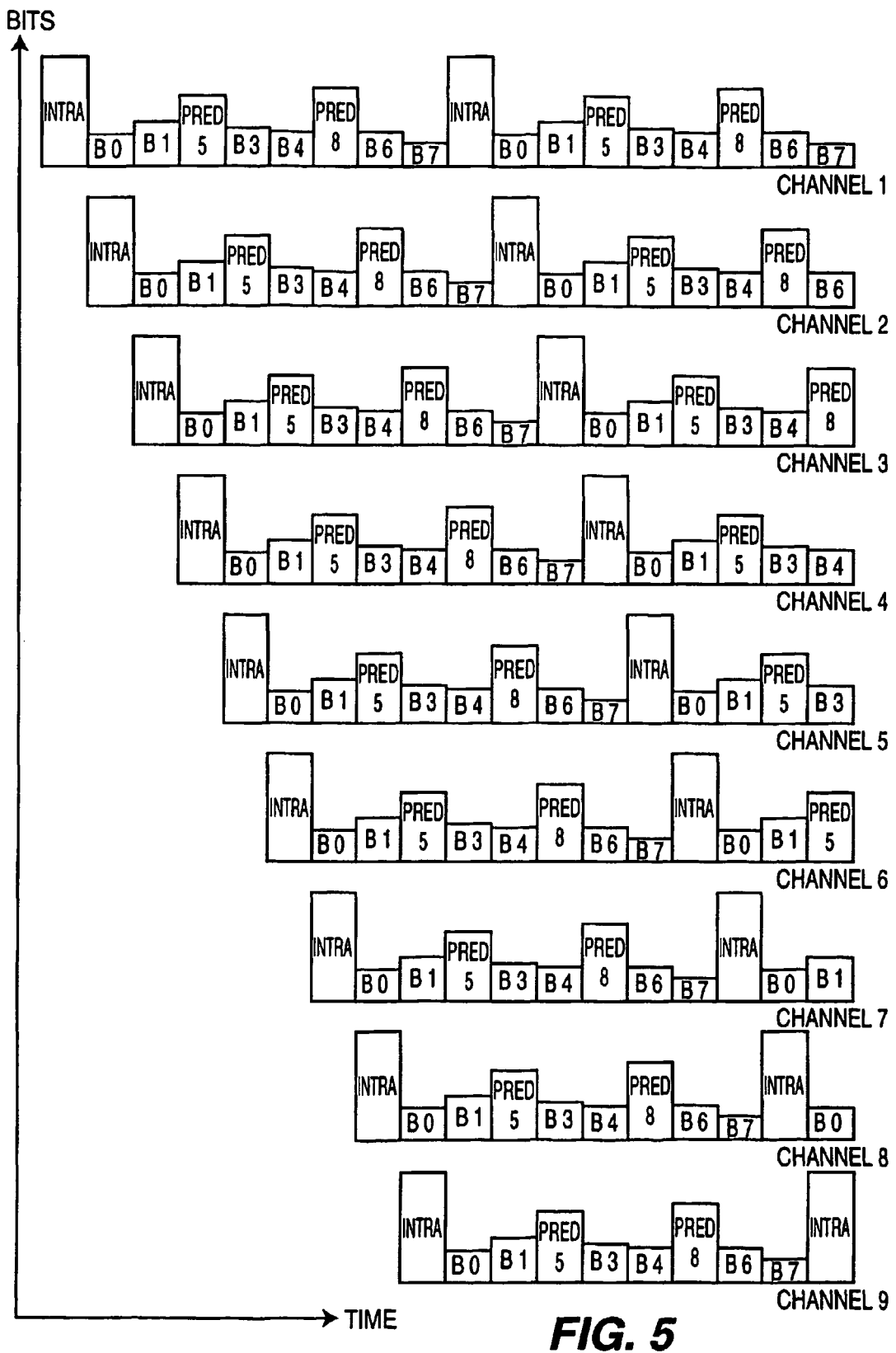
FIG. 5 is an illustration of a video broadcast system using staggered I frames and having 9 video channels, in accordance with the principles of the present invention.

To further illustrate the principles of the present invention, a frame staggering arrangement for a system with 9 video channels and a 9 frame GOP length is depicted in FIG. 5. With the illustrated channel/GOP symmetry, the staggering order does not matter since the distance between I frames is 1 for all channels. Therefore the total bit allocation for each frame time is uniform. With such an arrangement, the staggering/bit-allocation algorithm is straightforward. For a given frame time, the channel with the I frame gets a pre-determined bit allocation (the highest priority), then the channels with the P frames get a hierarchical bit allocation based on their distance from the I frame, and then the same procedure for the B-frames as the lowest priority frames. As can readily be seen, this algorithm could be implemented with a look up table in the stat mux controller.

The uniform I frame distribution (i.e., each successive channel having the I-frame shifted by one frame from the frame position of the I-frame in the prior channel) shown for the 9 channel case of FIG. 5 can be extended to larger systems by selective manipulation of the GOP structure. Such an optimization of the GOP structure in order to create a uniform distribution of I frames is possible because GOP structures are not very restrictive—frame ordering information is in the bitstream such that a decoder can determine the correct order. Therefore some manipulation of the GOP structure can be done in order to achieve a uniform frame distribution system. Although a number of GOP structures can be determined to accommodate such a uniform frame distribution, and will be readily derived by those skilled in the art, the following methodology provides one particular such structure and may be regarded as a preferred embodiment of the invention.

1) The number of frames in the sequence to be operated on by the stat mux of the invention should equal the number of channels, or an integral multiple thereof.

2) An individual GOP length is not typically longer than 0.5-1 second for broadcast environments. This could be longer for non-broadcast environments (e.g., internet downloads).

3) A GOP structure with 2 B frames between anchor frames is normally desired. However this results in a significant constraint on the possible GOP lengths available to satisfy (1) and (2) above. Therefore, to ameliorate this constraint, one can shorten any B frame section of a GOP with only minimal loss of compression efficiency.

An illustrative and exemplary set of GOPs developed according the described methodology for video broadcast systems operating with between 9 and 30 channels is shown in the tabulation of FIG. 6. In order to satisfy the constraint on individual GOP length, it may be necessary (in the case of higher numbers of channels) that the frame sequence operated on by the stat mux of the invention be comprised or two or more GOPs. In that circumstance, the stat mux may, of course, process all of the GOPs comprising the frame sequence in one operation. It is noted that, where warranted for overall GOP length, the first B frame pattern in the GOP is shortened. However, it should be understood that any other sequence of B frames in the GOP may be selected for shortening.

The essential restriction in the derivation of such a multi-channel GOP structure, as noted above, is to keep the number of frames in the GOP structure(s) equal to the number of video channels (or an integer multiple of them).

It should be understood that there are other options for defining the GOP structure to carry out the frame staggering method of the invention. For example, in the case of 30 channels, 3 GOPs of 10 frames each could be used—(e.g., IPBBPBBPBB, IPBBPBBPBB, IPBBPBBPBB). The tradeoff is that I frame intervals are shorter, but there is higher I frame overlap for processing by the staggered stat mux algorithm.

In any alternative GOP structure, the established trade-offs for GOP structure design should still be considered. In particular, the shorter the GOP, the less efficient the compression process will be, since I frames are the largest frames. However, short GOPs also offer advantages since they allow shorter channel change times and reduced encoder drift periods.

A system architecture to carry out the staggered frame stat mux of the invention can be implemented using simple and well defined elements. Moreover, that system architecture reduces design complexity when compared to a more traditional stat mux system. Some of the advantages for the invention may include:

A staggered stat mux broadcast system can be used without the need for real time complexity measures from the encoders. This simplifies the encoders and the stat mux controller.

A simple bit allocation methodology can be used that is optimized for the broadcast system. That is, the same bit allocation values could be used for every frame time—the Intra frames getting the larger values, followed by P frames and B frames.

The system architecture includes a frame synchronizer, which is normally provided in real time encoding systems in order that the encoder synchronizes itself with the incoming analog video. Various designs are known and may be used. Since all encoders are frame synchronized, in accordance with the principles of the present invention, the specific technique used does not matter as long as the frame periods are the same phase and period.

In order to stagger the I-frames (and succeeding frames in a GOP) for the channel encoders, a simple register delay line may be implemented that delays the encoder reset signal by the frame rate clock. However, this will result in a shared reset for all encoders. Such an approach could be problematic in a multi-channel broadcast system because, in practice, an encoder must occasionally be upgraded or reset, but the service provider will not want to reset all the channels simultaneously each time this operation is carried out.

Figure 7:
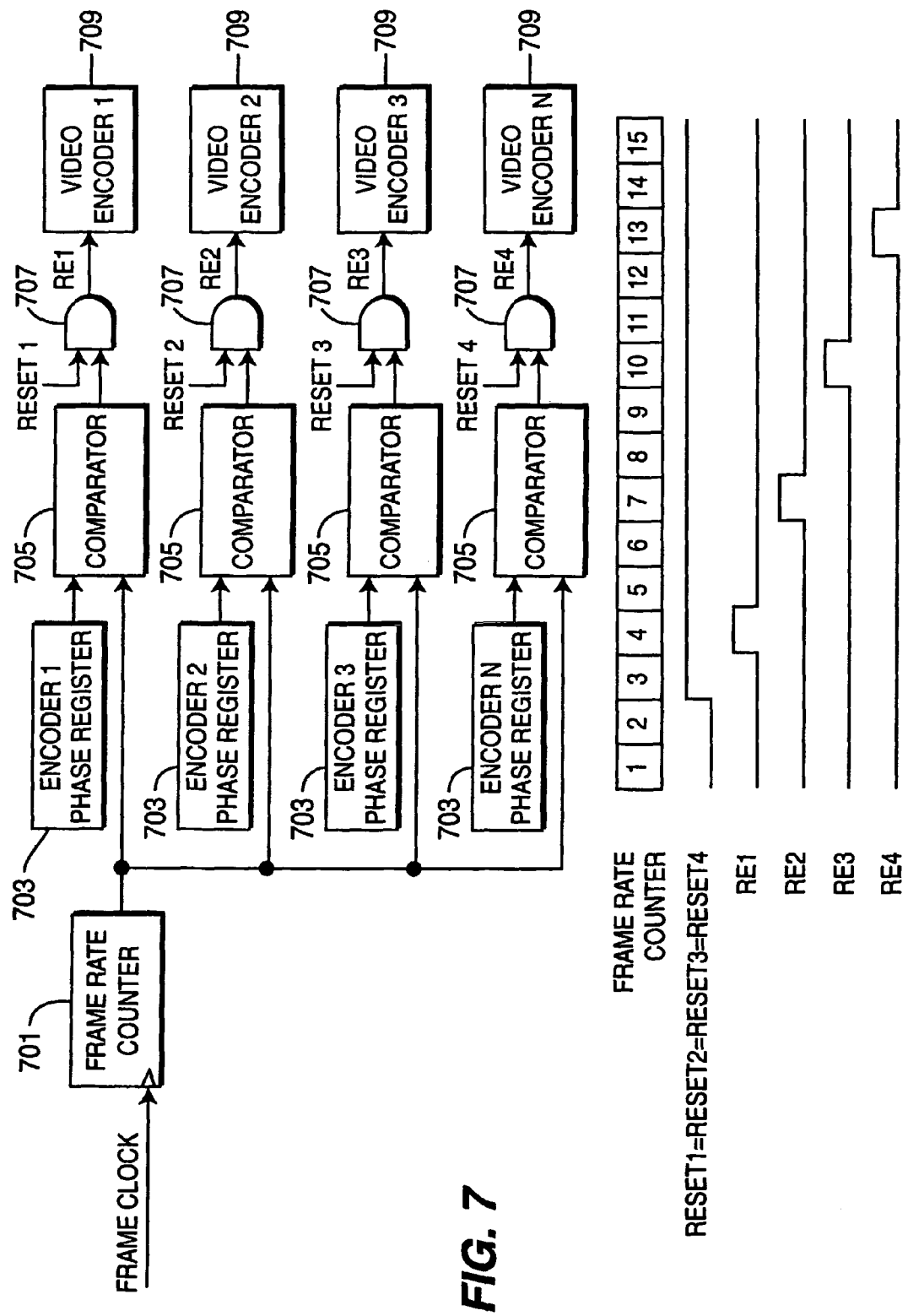
FIG. 7 is a block diagram of an exemplary implementation of the invention in a video broadcast system.

Accordingly, for a preferred embodiment of the invention, the frame-stagger approach is to create a frame rate counter and a register based comparator for each encoder. The output of the comparator gives the correct phase for the reset for each encoder. In this way, each encoder can be individually reset. An exemplary architecture for implementing this preferred approach is schematically depicted in FIG. 7. With reference to the figure, Frame Rate Counter 701 is driven by a frame rate clock and would normally be implemented as a digital counter. The Frame Rate Counter operates to synchronize the reset signals for the Video Encoders 709. Each encoder will be reset on a different frame boundary in order to start its sequence at the appropriate time to enable the staggered I frame start time, in accordance with the principles of the present invention. To achieve that end, each Encoder Phase Register 703 is loaded with a frame offset for its corresponding video encoder. The timing diagram of the figure shows the frame offsets of the phase registers for illustrative phases of 4, 7, 10, and 13. The Comparator 705, which receives as inputs the outputs of the frame rate counter and the appropriate encoder phase register, provides an output that is active high when the frame rate counter value and the phase register offsets are equal. This comparator output signal is then gated by the reset signal (shown in the timing diagram) with AND Gate 707. Therefore, when an encoder reset signal, at output of the corresponding AND gate, is driven high, the encoder will be reset on its appropriate phase at the frame offset established for that encoder in accordance with the frame stagger principles of the present invention.

It is to be noted that the architecture depicted in FIG. 7 is directed only to illustrate the inventive principles of the present invention. To place that architecture into the context of an overall stat mux system, such as depicted in FIG. 7, it should be understood that frame stagger implemented by this arrangement eliminates the need for complexity and bit allocation signals and, as well, replaces the stat mux controller and frame sync blocks of the system shown in FIG. 1. Stated somewhat differently, the frame stagger circuitry of FIG. 7 takes the place of the stat mux controller and frame sync blocks of FIG. 1 in an overall stat mux system implementation.

As new channels are added or deleted from the system, a new GOP structure and frame staggering order can be adopted easily by loading new reset phases into the comparator registers.

It is to be emphasized that, with the staggered frame stat mux methodology of the present invention, the stat mux controller need only consider static channel characteristics and can ignore dynamic complexity measures. The system can of course be adapted to also use such complexity measures, and the bit allocation efficiency may be even further improved, but the principles of the present invention will deliver an effective stat mux capability with considerable simplification from systems that must rely on complexity measures.

Numerous modifications and alternative embodiments of the invention will be apparent to those skilled in the art in view of the foregoing description. In particular, the application of the methodology of the invention to other or additional GOP structure arrangements is intended to be within the contemplation of the invention. It is also contemplated that the principles of the present invention will be applied in systems operating under alternate coding/compression standards, including MPEG-4, H.26L, and proprietary systems (Windows Media Player™, Real Player™, etc).

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

What is claimed is:

1. In a multi-channel video transmission system in which video segments are encoded into a plurality of frames organized into frame groups having a structure of a sequence of different frame types, a method for arranging frame transmission alignment among a plurality of channels concurrently transmitted via a common transmission medium, the method comprising:
   identifying a specified frame type in each of said plurality of channels; and
   causing ones of said specified frame type to be arranged so as to avoid temporal alignment with other ones of said specified frame type in corresponding other ones of said plurality of channels,
   wherein in each channel each video segment comprises a same length of the frame group and each frame group comprises the same sequence of different frame types.

2. The method of claim 1 wherein said ones of said specified frame type and other ones of said specified frame type are temporally displaced, relative to one another.

3. The method of claim 1 wherein said specified frame type in successive ones of said plurality of channels are displaced by one frame position relative to a location of said frame type in a preceding channel.

4. The method of claim 1 wherein each of said plurality of channels is synchronized to a common frame rate and phase.

5. The method of claim 1 wherein said plurality of frame types include a high priority frame type and a low priority frame type.

6. The method of claim 1 wherein said plurality of frame types include at least one intermediate priority frame type.

7. The method of claim 6 wherein said video segments are encoded using an MPEG coding methodology and further wherein said high, intermediate and low priority frame types correspond respectively to MPEG Intra-coded, Predictive, and Bi-directionally Predictive frames.

8. The method of claim 5 wherein ones of said low priority frame type are optionally dropped to reduce required transmission bandwidth.

9. The method of claim 1 wherein said video segments are encoded using an MPEG coding methodology and correspond to an MPEG Group of Pictures.

10. In a multi-channel video transmission system in which video segments are encoded into a plurality of frames organized into frame groups having a structure of a sequence of different frame types, an apparatus for arranging frame transmission alignment among a plurality of channels concurrently transmitted via a common transmission medium, the apparatus comprising:
    means for identifying a specified frame type in each of said plurality of channels; and
    means for causing ones of said specified frame type to be arranged so as to avoid temporal alignment with other ones of said specified frame type in corresponding other ones of said plurality of channels,
    wherein in each channel each video segment comprises a same length of the frame group and each frame group comprises the same sequence of different frame types.

11. In a video transmission system in which video segments are encoded into a plurality of frame types, a method for arranging frame transmission alignment among a plurality of channels concurrently transmitted via a common transmission medium, comprising:

identifying a specified frame type in each of said plurality of channels; and causing ones of said specified frame type to be arranged so as to avoid temporal alignment with other ones of said specified frame type in corresponding other ones of said plurality of channels, wherein said video segments include a fixed number of frame positions and said fixed number of frame positions is an integer multiple of a number of said plurality of channels, and wherein said fixed number of frame positions is equal to the number of said plurality of channels, such that the integer multiple is equal to one.

12. In a video transmission system in which video segments are encoded into a plurality of frame types, an apparatus for arranging frame transmission alignment among a plurality of channels concurrently transmitted via a common transmission medium, comprising:

means for identifying a specified frame type in each of said plurality of channels; and means for causing ones of said specified frame type to be arranged so as to avoid temporal alignment with other ones of said specified frame type in corresponding other ones of said plurality of channels, wherein said video segments include a fixed number of frame positions and said fixed number of frame positions is an integer multiple of a number of said plurality of channels, and wherein said fixed number of frame positions is equal to the number of said plurality of channels, such that the integer multiple is equal to one.

13. The method of claim 1, wherein an optimum staggering order of said specified frame type is obtained by maintaining a distance between frames of said specified frame type at a maximum on average, in consideration of the number of said plurality of channels.

14. The apparatus of claim 10, wherein an optimum staggering order of said specified frame type is obtained by maintaining a distance between frames of said specified frame type at a maximum on average, in consideration of the number of said plurality of channels.

15. In a video transmission system in which video segments are encoded into a plurality of frame types, an apparatus for arranging frame transmission alignment among a plurality of channels concurrently transmitted via a common transmission medium, comprising:

means for identifying a specified frame type in each of said plurality of channels; and means for causing ones of said specified frame type to be arranged so as to avoid temporal alignment with other ones of said specified frame type in corresponding other ones of said plurality of channels, wherein said video segments include a fixed number of frame positions and said fixed number of frame positions is an integer multiple of a number of said plurality of channels, wherein said causing means comprises a frame rate counter, a plurality of phase registers, and a plurality of comparators, wherein the frame rate counter has an output connected in signal communication with a first input of each of the plurality of comparators, and each of the plurality of phrase registers has a respective output that is connected in signal communication with a second input of a respective one of the plurality of comparators.

16. The apparatus of claim 15, wherein the video segments are operated on by corresponding ones of channel video encoders, and the frame rate counter synchronizes reset signals associated with the channel video encoders.

17. The apparatus of claim 16, wherein ones of the plurality of registers are loaded with frame offset values corresponding to a selected frame stagger for an associated one of the plurality of channels.

18. The apparatus of claim 17 wherein ones of the plurality of comparators are functionally associated with ones of the channel video encoders, the plurality of comparators being operative to provide a timing signal as an output corresponding to the selected frame stagger for the associated one of the plurality of channels.

19. The apparatus of claim 18 wherein said causing means further comprises:

a plurality of gates adapted to receive as inputs an encoder reset signal level and an output of ones of the plurality of comparators and to provide as an output a reset signal for an associated one of the channel video encoders, wherein respective ones of the channel video encoders are reset at respective timing points corresponding to the selected frame stagger for a respective one of the plurality of channels.

20. The method of claim 1 wherein said video segments include a fixed number of frame positions and said fixed number of frame positions is an integer multiple of a number of said plurality of channels.

21. The apparatus of claim 20 wherein said video segments include a fixed number of frame positions and said fixed number of frame positions is an integer multiple of a number of said plurality of channels.

* * * * *